(12) United States Patent
Boone

(10) Patent No.: US 11,487,122 B1
(45) Date of Patent: Nov. 1, 2022

(54) HUMAN-POWERED ADVANCED RIDER ASSISTANCE SYSTEM

(71) Applicant: Michael Ross Boone, Alexandria, VA (US)

(72) Inventor: Michael Ross Boone, Alexandria, VA (US)

(73) Assignee: Michael Ross Boone, Dunfries, VA (US)

( * ) Notice: Subject to any disclaimer, the term of this patent is extended or adjusted under 35 U.S.C. 154(b) by 0 days.

(21) Appl. No.: 17/408,410

(22) Filed: Aug. 21, 2021

Related U.S. Application Data

(60) Provisional application No. 63/107,574, filed on Oct. 30, 2020.

(51) Int. Cl.

| | |
|---|---|
| *G02B 27/01* | (2006.01) |
| *H04R 1/08* | (2006.01) |
| *G06F 3/16* | (2006.01) |
| *B60R 11/04* | (2006.01) |
| *B62J 50/22* | (2020.01) |
| *B64D 43/00* | (2006.01) |
| *B63B 49/00* | (2006.01) |
| *H04N 13/243* | (2018.01) |
| *G06V 20/20* | (2022.01) |
| *G06V 20/56* | (2022.01) |

(52) U.S. Cl.
CPC .......... *G02B 27/0172* (2013.01); *B60R 11/04* (2013.01); *B62J 50/22* (2020.02); *B63B 49/00* (2013.01); *B64D 43/00* (2013.01); *G06F 3/165* (2013.01); *G06V 20/20* (2022.01); *G06V 20/56* (2022.01); *H04N 13/243* (2018.05); *H04R 1/08* (2013.01); *G02B 2027/014* (2013.01); *G02B 2027/0138* (2013.01); *G02B 2027/0141* (2013.01); *H04N 2213/001* (2013.01); *H04R 2499/15* (2013.01)

(58) Field of Classification Search
CPC ........ G02B 27/0172; G02B 2027/0138; B60R 11/04; B62J 50/22; G06V 20/20; G06B 20/56; G01D 2207/20
See application file for complete search history.

(56) References Cited

U.S. PATENT DOCUMENTS

| | | |
|---|---|---|
| 5,243,417 A | 9/1993 | Pollard |
| 6,065,832 A | 5/2000 | Fuziak |

(Continued)

FOREIGN PATENT DOCUMENTS

| | | |
|---|---|---|
| CN | 108025767 B | 9/2015 |
| DE | 102010042048 B | 10/2010 |

(Continued)

OTHER PUBLICATIONS

Sarita Joshi, Andrea Sabet, and David Simcik, Making cycling safer with AWS DeepLens and Amazon SageMaker object detection, AWS Machine Learning Blog, Oct. 7, 2020.

*Primary Examiner* — Said Broome

(57) ABSTRACT

A bicycle system with omnidirectional viewing having front-facing, stereoscopic video camera devices relying on computer vision. The front-facing, stereoscopic video camera devices positioned on the bicycle help identify, classify, and recommend a safe trajectory around obstacles in real-time using augmented reality. The bicycle system details safety-related and guidance-related information.

11 Claims, 15 Drawing Sheets

(56) References Cited

U.S. PATENT DOCUMENTS

| | | | | |
|---|---|---|---|---|
| 6,979,866 | B2 * | 12/2005 | Azuma | H01L 21/84 |
| | | | | 257/250 |
| 7,598,927 | B2 * | 10/2009 | Yamazaki | B60W 50/14 |
| | | | | 345/7 |
| 8,405,573 | B2 | 3/2013 | Lapidot | |
| 9,318,023 | B2 | 4/2016 | Moshchuk | |
| 9,488,757 | B2 | 11/2016 | Mukawa | |
| 9,615,067 | B1 | 4/2017 | Foote | |
| 9,701,246 | B2 | 7/2017 | Turk | |
| 9,804,597 | B1 | 10/2017 | Ferguson | |
| 9,916,508 | B2 | 3/2018 | Pillai | |
| 9,995,936 | B1 * | 6/2018 | Macannuco | G06F 3/0304 |
| 10,015,377 | B2 | 7/2018 | Sesti | |
| 10,209,522 | B2 | 2/2019 | Gallery | |
| 10,495,476 | B1 * | 12/2019 | Yu | G01C 21/3415 |
| 2008/0239080 | A1 | 10/2008 | Moscato | |
| 2015/0228066 | A1 | 8/2015 | Farb | |
| 2016/0187651 | A1 * | 6/2016 | Border | G06K 9/00845 |
| | | | | 345/8 |
| 2019/0050993 | A1 * | 2/2019 | Jang | G06K 9/00798 |
| 2019/0318181 | A1 * | 10/2019 | Katz | B60W 40/08 |

FOREIGN PATENT DOCUMENTS

| | | |
|---|---|---|
| DE | 102015225372 A1 | 12/2015 |
| EP | 0313223 A1 | 9/1987 |
| EP | 0475502 B1 | 9/1990 |
| EP | 3159730 A1 | 10/2015 |
| JP | 20166629889 B2 | 10/2016 |
| KR | 101824982 B1 | 10/2015 |

* cited by examiner

HUMAN-POWERED ADVANCED RIDER ASSISTANCE SYSTEM

CROSS-REFERENCE TO RELATED APPLICATION

The nonprovisional application claims the filing date benefit of U.S. Provisional Application No. 63/107,574 filed Oct. 30, 2020.

BACKGROUND

The National Highway Traffic Safety Administration's National Survey of Bicyclists and Pedestrian Attitudes[1] estimates millions are injured yearly riding bicycles every year. In 2018, per latest data available as of this filing, the National Highway Traffic Safety Administration reported 857 pedalcyclist fatalities and 47,000 injuries occurred in the United States of America[2]. In 2018, 79% of pedalcyclist fatalities occurred in urban settings. 40% of fatalities occurred at intersections and along sidewalks, bicycle lanes, median/crossing islands, parking lanes/zones, shoulders/roadsides, driveway access, shared-used paths, and non-traffic areas. Both unreported and reported injury statistics are presumed to follow similar trends.

[1] National Highway Traffic Safety Administration National Survey of Bicyclist and Pedestrian Attitudes and Behavior, Volume II: Findings Report
[2] National Highway Traffic Safety Administration Quick Facts 2018 (dot.gov)

Falling, riding error, and collisions with fixed objects make-up more than a third of classified causes for bicyclist injuries. Many bicycle crashes are avoidable, but real-time active safety tools for pedalcyclist are lacking both in spaces shared with automobiles, pedestrians, and other pedalcyclists. Frequently; on shared spaces with automobiles, pedalcyclists rely on motor vehicle operators to use tools like Driver Assistance Systems (DASs) to avoid and mitigate the impact of collisions with bicycles. Few equivalent tools, devices, or systems for bicyclists exist. Existing pedalcyclist features are passive, like helmets and handlebar bells. Other safety measures to prevent crashes are more preparatory and sometimes costly in nature including classroom instruction, both real-world and virtual, including simulated training. Many localities are also investing more strategically in hard infrastructure for the benefit of all travel way users, including pedalcyclists.

In automobiles, DAS have been found to prevent approximately 14% to 30% of crashes depending on roadway facility[3]. DASs for bicycles have the potential to prevent hundreds of deaths and thousands of injuries, particularly as many governments and nongovernmental organizations are committing to Vision Zero, the multinational road traffic safety initiative to eliminate all fatalities and serious injuries.

[3] Institute of Electrical and Electronic Engineers Article

SUMMARY OF THE INVENTION

Embodiments of the invention provide for a system that projects safety-related and guidance-related information onto a display of real-world elements in real-time using augmented reality for a bicyclist. Embodiments include:
  front-facing, stereoscopic video camera devices comprised of one or more cameras to capture digital images of a surrounding environment; and
  an embedded system to process digital images and send safety-related and guidance-related information to the wearable display apparatus; and
  a wearable display apparatus that projects safety-related and guidance-related information onto real-world elements in real-time through the display of an augmented reality.

Embodiments of the invention can include front-facing, stereoscopic video camera devices affixed to parts of the bicycle or embedded within the wearable display apparatus of the bicyclist.

Embodiments can further include a wearable display apparatus that allows for projection of safety-related and guidance-related information through both augmented and mixed reality.

Embodiments of the invention can further include projected safety-related and guidance-related information that is audible, toggleable in level of detail, and customizable.

Embodiments of the invention can further include the ability to power on and adjust the settings tactilely and via voice control.

Embodiments of the invention can further include an eye-tracking system that monitors the operator's alertness, responsiveness, and activity.

Embodiments of the invention can further include an audio system for recording and reporting stream of digital video images in addition to alerting the operator of pending or upcoming pertinent safety-related and guidance-related information.

Embodiments of the invention can further include a wireless adapter to transmit digital images and video across components and other wide area networks.

Embodiments of the invention can further include a harnessing system to keep system components together, properly mounted, and aligned if installed on the bicycle frame itself.

Embodiments of the invention could include stereoscopic video camera devices that adjust in perspective and position on the bicycle. Examples include adjustments to pan, rotate, tilt, and zoom the field of view.

Embodiments of the invention could include a rechargeable single battery or battery pack with charger to power the system.

Embodiments of the invention could include a regenerative electromechanical system to dynamically power the invention.

Embodiments can include a power source that is either self-contained or connected to the battery or battery pack using wires for all system components.

Embodiments of the invention can include color-coded and illuminated elements of the wearable display apparatus. For example, an external array of lights may be lit to show that the apparatus is powered on.

FIELD

This invention relates to a forward vision system for vehicles, most specifically a system providing operators of bicycles, motorcycles, scooters, and other vehicles with the capability of automatically identifying fixed and moving animals, objects, persons, signs, other vehicles, construction and crash sites, and travel way debris; changes in surrounding topography and terrain grade; uneven travel way surfaces; and clear and obstructed paths.

BRIEF DESCRIPTION OF THE DRAWINGS

The invention will be more readily understood by reference to the following description, taken with the accompanying drawings, in which:

FIG. 2 also shows the continuous power source 38 and single board computer 17 embedded in the down tube 37.

PRIOR ART

Figure 1:
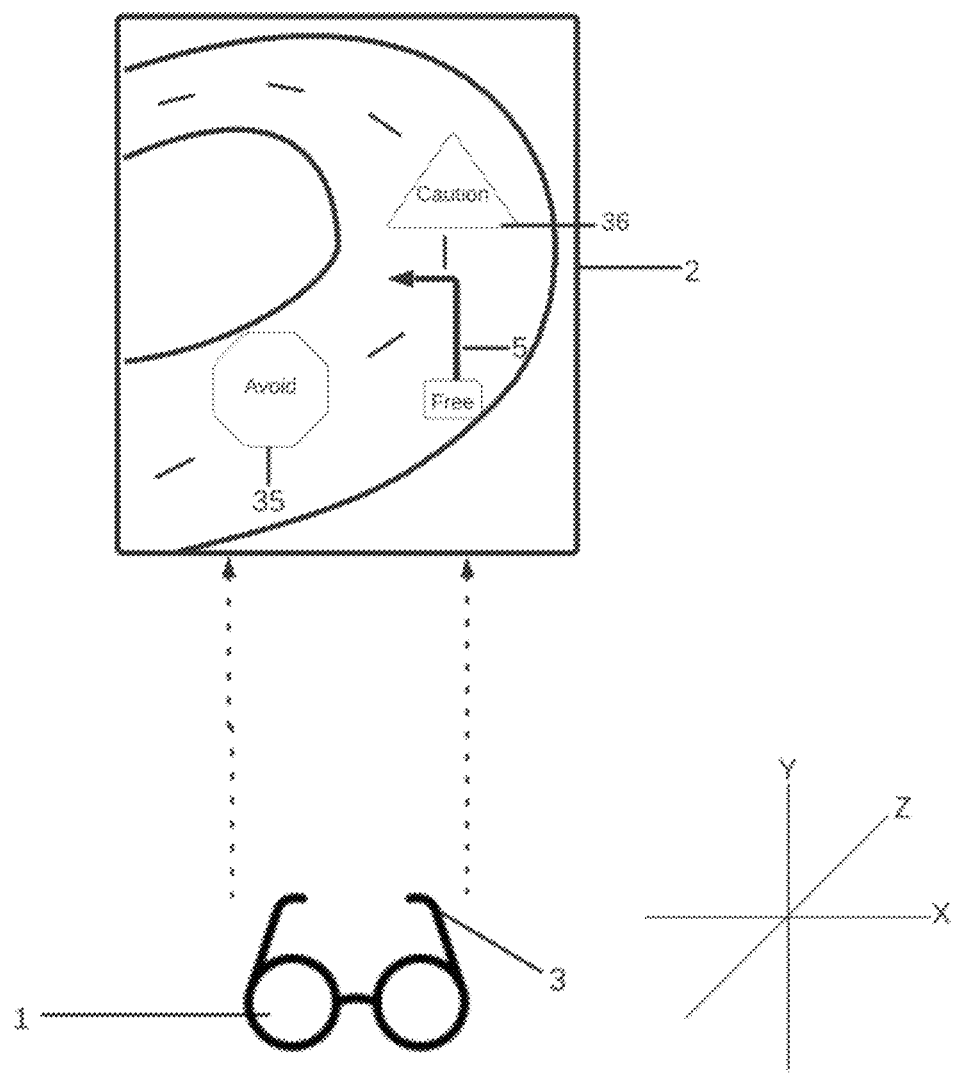
FIG. 1 shows a representative wearable display apparatus projecting safety-related and guidance-related information onto a display of real-world elements in real-time using augmented reality.

There are countless computer vision software models for object detection, depth estimation, free space segmentation, image classification, object tracking. Examples of each are provided below:
Depth Estimation: Atlas, Deltas, and SDC-Depth
Free Space Segmentation: Free Space Detection Fully Convolutional Network, StixelNet, Terrain Safety Segmentation
Image Classification: BiT-L, EffNet-L2 (SAM), LaNet
Object Detection: HVRNet+ResNet101, Yolo, YoloV3
Object Tracking: FairMOT, Modern Multiple Object Tracking, Unsupervised Learning of Object Structure and Dynamics from Videos This present invention combines models like those referenced above and renders their outputs to provide helpful, safety-related and guidance-related information to the operator.

Below are the advantages are not provided by prior art.

US10015377B2 strictly discloses a design for assembling a vehicle camera and method of manufacturing using a front camera housing and lens assembling similar to this present invention. No use for these cameras in a system is described in this present invention.

US10209522B2 discloses a helmet-mounted display design to provide interface functions to the operator of the vehicle; it provides a see-through display, sensor systems, and processing subsystems that provide the device's "location, orientation, bearing." This present invention includes a display that shows multiple fields of view surrounding the bicycle in addition to safety-related and guidance-related information superimposed using augmented reality images.

EP3159730A1 discloses a head-mounted display technology with a liquid crystal lens that displays a virtual image superimposed on a scene in front of the vehicle for a driver. This present invention displays multiple fields of view as well as safety-related and guidance-related information.

US20080239080A1 discloses the use of a head-mounted rear view system. This present invention displays multiple views including the rear as well as safety-related and guidance-related information.

U.S. Pat. No. 5,243,417A discloses a rear-vision system for a rider of a two-wheeled vehicle having a frame and moveable handlebars. This present invention displays views and safety-related and guidance-related information from the front, rear, and sides (both left and right).

EP0313223A1 discloses a heads-up display system for detecting and predicting motion-related parameters of the vehicle that enable the driver to see limited trajectories ahead. This present invention presents a method and system for superimposing safety-related and guidance-related images and words, including avoidance trajectory, using augmented reality to the bicycle.

US9701246B2 discloses a camera-based system that processes image data to determine objects present in the field of view in at least one of the cameras using a kinematic model. While this present invention describes detecting and tracking objects in the camera-based system's field of view, this present invention presents a method and system for superimposing safety-related and guidance-related images and words using augmented reality to the bicycle.

JP6629889B2 discloses a heads-up display via the projection of a digital images on a windshield. This present invention presents a method and system for displaying toggleable safety-related and guidance-related images and words using augmented reality and multiple front-facing, stereoscopic video camera devices.

U.S. Pat. No. 6,065,832A discloses a pair of eyeglasses with integrated rear view mirrors. Although some of these wearable apparatus designs are head-mounted and integrated like the present invention, the present invention relies on front-facing, stereoscopic video camera devices that project safety-related and guidance-related images and words using augmented reality.

US9488757B2 discloses a head-mounted video display for operators constantly changing viewpoints. While this present invention also relies on front-facing, stereoscopic video camera devices, this present invention details a method and a system for displaying safety-related and guidance-related images and words superimposed on the real-world environment using augmented reality.

U.S. Pat. No. 9,615,067B1 discloses an entire head-mounted digital viewing apparatus that houses sensors, digital image processing, and cameras in an all-in-one configuration display. This present invention details a method and a system for displaying safety-related and guidance-related images and words superimposed on the real-world environment using augmented reality.

US2014013407A1 discloses for a heads-up display system with a similar wearable apparatus to the preferred embodiment of this present invention. This present invention is specifically for displaying safety-related and guidance-related images and words superimposed on the real-world environment using augmented reality.

EP0313223A1 discloses a heads-up display for a road vehicle's motion-related parameters and discloses the ego vehicle's forward trajectory external to its surroundings. This present invention recommends a bicycle's forward trajectory based upon the real-world environment and the confluence of computer vision software models. In addition, this present invention also superimposes safety-related and guidance-related information of the real-world environment using augmented reality. This present invention also superimposes safety-related and guidance-related information of the real-world environment using augmented reality.

US8.405573B2 discloses a generic head-mounted display system for displaying video signals to a user's eye via a separate display source that relies on a light-guide optical element (LOE). Similar to this present invention, components include an electronic module, a power supply, and a portable control unit. This present invention also superimposes safety-related and guidance-related information of the real-world environment using augmented reality.

US20160163108A1 discloses an augmented reality head-up display with eye detector that detects the position of objects outside of the vehicle at which the driver is looking to allow the driver to "intuitively perceive the real-world driving environment." This invention displays the augmented reality image on the windshield. It is intended to display motion and navigational related information. This present invention detects, classifies, and tracks objects; perceives relative depth; and recommends a forward trajectory based on free space. This present invention also superimposes safety-related and guidance-related images and words of the real-world environment using augmented reality.

US9916508B2 discloses a method for detecting roadway objects in real-time images. While this present invention could use a similar method for object detection and tracking, this present invention combines other computer vision software tasks including depth estimation, free space segmentation, image classification. No mention of a display system is disclosed as illustrated in this present invention.

Outside of patents for individual displays and display techniques, most related work is technical, describing how to perform and automated maneuvers.

U.S. Pat. No. 9,804,597B1 discloses general methods for receiving digital images, identifying object locations within digital images, and indicating a plurality of objects detected in the environment from sources like Radio Detection and Ranging, Light Detection and Ranging, maps, sensors, and global positioning systems. This present invention not only detects and tracks objects within digital images, it uses a plurality of computer vision software models to recommend a safe forward trajectory for the bicyclist while also providing other safety-related and guidance-related information related to people, objects, and changes in depth.

DE102015225372A1 discloses a method and a system for displaying moving visual image information for a cyclist from the rear using a portable device. The present invention incorporates computer vision models to display safety-related and guidance-related information to inform the bicyclist in all fields of view.

DE10201004204 discloses a method for supporting the operator in which a maneuver's longitudinal and lateral guidance is automated. An avoidance trajectory is calculated based on current surroundings. This present invention displays safety-related and guidance-related information, including calculating an avoidance trajectory forward based on front-facing, stereoscopic camera devices and computer vision models. This present invention fully relies on the operator to manually control the vehicle's trajectory.

KR101824982B1 discloses a control method comprised of a display and sensing unit for sensing to assist the operator in avoiding a crash with a moving object adjacent to an automobile. The present invention proposes a system and method for displaying safety-related and guidance-related information superimposed onto real-world elements in real-time through the display of an augmented reality.

US9318023B2 discloses a method for performing a vehicular, collision avoidance maneuver via an optimal path curvature limited by one or more constraints. This present invention is a system and a method for displaying safety-related and guidance-related information relies to the operator to using augmented reality superimposed on digital images of the real-world environment.

CN108025767B discloses a system uses of electronic circuits to sense vehicle position and inform overtaking maneuvers (around any other type of vehicle, including bicycles). This present invention displays safety-related and guidance-related information for multiple fields of view around a bicycle.

WO2010101749A1 discloses a generic framework for generating machine inputs for trajectory planning, threat assessment, and semi-autonomous control of a passenger vehicle. This present invention is a bicycle system that relies on displaying sensor inputs using augmented reality and relies on the operator to manually controlling the vehicle's trajectory.

DETAILED DESCRIPTION OF THE EMBODIMENTS

Embodiments of the invention are described below with reference to FIGS. 1-15

Embodiments of the invention include a wearable display apparatus 3 for projecting safety-related 4 and guidance-related 5 information superimposed onto the viewport 1 of a bicyclist's real-world environment 6 in real-time using augmented reality as shown in FIG. 1. Examples of safety-related information 4 include information about the detection, location, and tracking of road debris, objects, people, and changes in terrain in the real-world environment 6. Examples of guidance-related 5 information include information specific to assisting the bicyclist in maneuvering the bicycle 7 in the real-world environment 6. Examples of elements in the real-world environment 6 include, but are not limited to road debris, objects, people, and changes in terrain.

FIG. 1 illustrates one embodiment of a representative wearable display apparatus 3, sunglasses and shows a representative view 2 a cyclist might see using the reimaged process and system.

Other examples of wearable display apparatuses 3 include glasses, goggles, helmets, lens, or any head supported structure or platforms. A viewport 1 embedded in the sunglasses shows the real-world environment 6 superimposed with safety-related 4 and guidance-related images and words to inform the bicyclist of the view 8 ahead of the bicycle 7. The viewport may toggle between one or multiple fields of view (omnidirectional) 8 to the front, left, right, and behind the bicycle 7 simultaneously with varying levels of safety-related 4 and guidance-related 5 information shown. The superimposed word "avoid" 35 indicates the presence of an element in the real-world environment 6 ahead of the bicyclist in the travel way identified by the front-facing, stereoscopic video camera device 9. The superimposed word "caution" 36 indicates a change in terrain elevation 26 ahead of the bicyclist outside of the travel way detected by the front-facing, stereoscopic video camera device 9. The word "free" indicates the path free of obstacles ahead of the bicyclist that avoids object and steers clear of the chain in terrain elevation 26 as shown in bicyclist's viewport 1 of the wearable display apparatus 3. The wording used in FIG. 1 is solely for illustration purposes. Adjacent to the wording are representative images to denote potential safety hazards in the real-world environment 6. In this instance, the octagon, arrow, and triangle complement the safety-related 4 and guidance-related 5 words, "avoid," "free," and "caution" respectively. The images of shapes and symbols used in FIG. 1 are also solely for illustration purposes.

Embodiments of this invention can be used for individual bicyclists; bicycle commuters; police, security, and military personnel riding bicycles; shared micromobility users especially those using bikes and scooters; automobile drivers, and human factors scientists researching transportation using simulation. The wearable display apparatus 3 superimposes safety-related 4 and guidance-related 5 images and words onto the viewport 1 of the bicyclist after analyzing digital images received from the front-facing, stereoscopic video camera devices 9.

Figure 2:
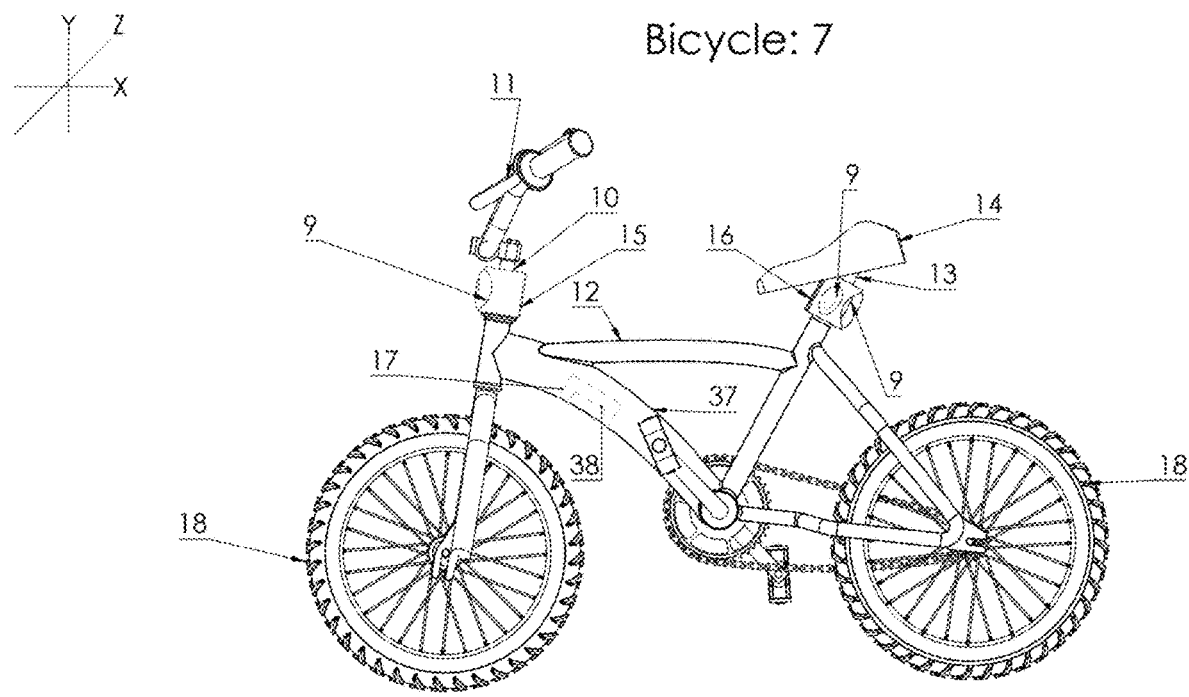
FIG. 2 shows the plan view of the representative embodiment affixed to a bicycle. In this view, it shows three (3) of the four (4) front-facing, stereoscopic video camera devices 9: one front-facing, stereoscopic video camera device 9 attached to the head tube 10 and two (2) of the set of three (3) attached to the seat post 14.
Figure 5:
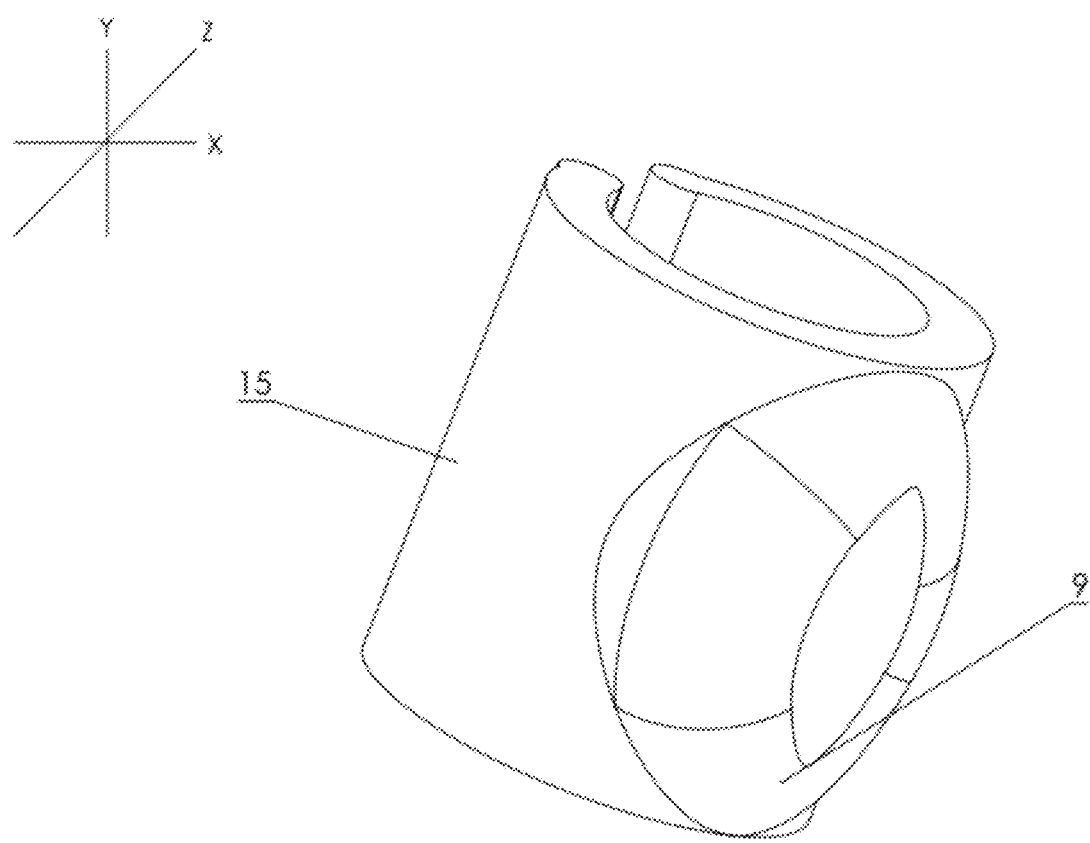
FIG. 5 illustrates the preferred embodiment of the front-facing, stereoscopic video camera devices for the present invention. The front-facing, stereoscopic video camera device attaches to the head tube using a front pen clamp.
Figure 6:
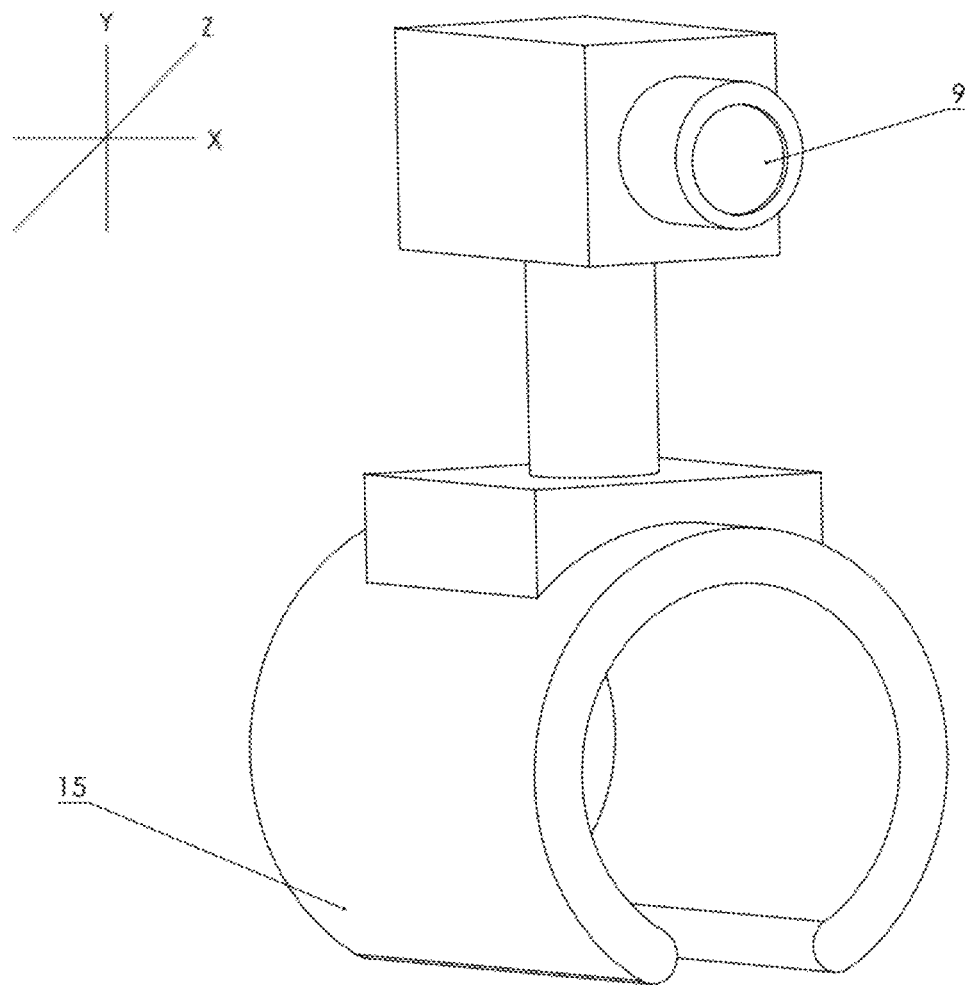
FIG. 6 illustrates an alternate embodiment of the front-facing stereoscopic video camera device for the present invention. The front-facing, stereoscopic video camera device attaches to the head tube using a front pen clamp.

FIG. 2 illustrates the front-facing, stereoscopic video camera devices 9 affixed on a representative bicycle 7. One (1) front-facing stereoscopic video camera device 9 is attached to the head tube 10 of the bicycle 7 between the handlebar stem 11 and the top tube 12 to capture digital images ahead of the bicyclist. Three (3) front-facing, stereoscopic video camera devices 9 are attached to the seat post 13 of the bicycle 7 below the seat 14 and above the top tube 12 to capture digital images of views 8 to the left, right, and behind the bicyclist respectively. Close-ups of the configuration of the front-facing stereoscopic video camera devices 9 can be seen in FIGS. 7 and 8. Other embodiments of the invention can include more and less configurations of front-facing, stereoscopic video camera devices 9 to capture digital images of the surrounding real-world environment 6. All front-facing, stereoscopic video camera devices 9 are attached to their respective tubes using front pen clamps 15 as shown in FIGS. 5 and 6 respectively. Affixing front-facing, stereoscopic video camera devices 9 using front pen clamps 15 also allows for adjustment. Other embodiments may use other forms of appending the front-facing, stereoscopic video camera devices 9 including affixing front-facing, stereoscopic video camera devices 9 onto the helmet or embedded in the wearable display apparatus 3. The four (4) stereoscopic video camera devices 9 operate in the forward-facing orientation with the lens 16 facing away from bicycle 7 the towards the real-world environment 6 to capture elements in the real-world environment 6. Front-facing, stereoscopic video camera devices 9 can be wireless, wire-free, or a combination thereof using Bluetooth and/or Wireless Fidelity (Wi-Fi). Digital images are continuously captured through each individual front-facing, stereoscopic video camera device 9 and sent to the embedded system 17 for processing. Detail around processing is described below FIG. 12.

Figure 3:
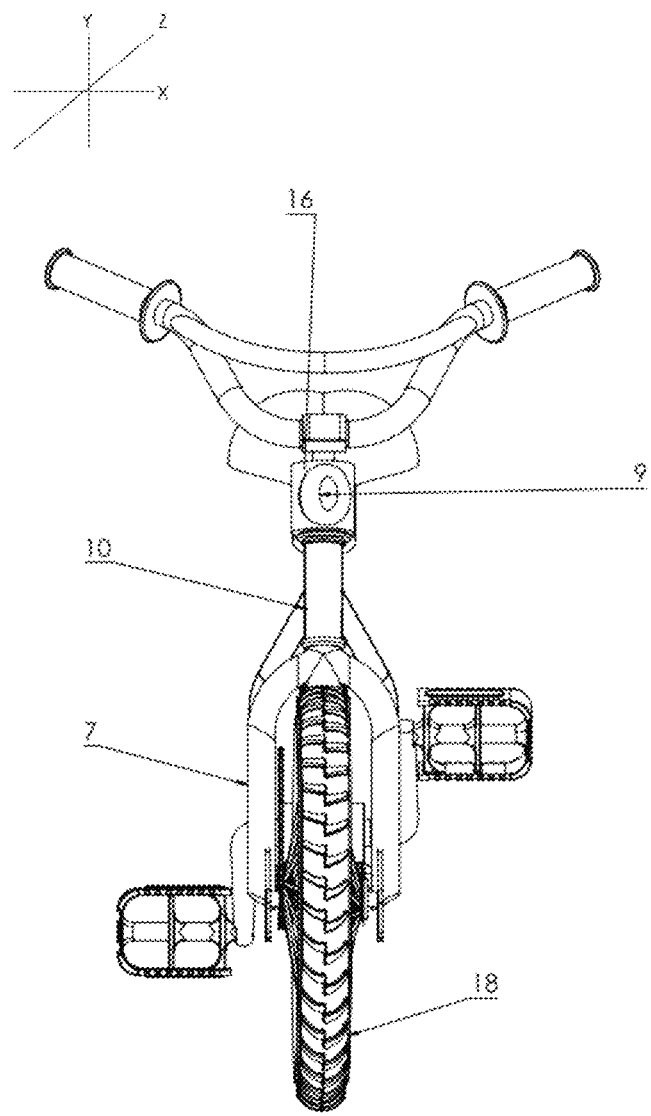
FIG. 3 is an elevation view of the front of the bicycle with the representative embodiment of the present invention. It shows one (1) front-facing, stereoscopic video camera device attached to the head tube above the tire and beneath the handlebar stem.

FIG. 3 illustrates an elevation view of the front of the representative bicycle 7. One (1) front-facing, stereoscopic video camera device 9 is affixed in the forward-facing orientation using a front pen clamp 15 to the head tube 10, positioned above the tire 18 and beneath the handlebar stem 11. This front-facing, stereoscopic video camera device 9 captures continuous digital images in front of the bicyclist.

Figure 4:
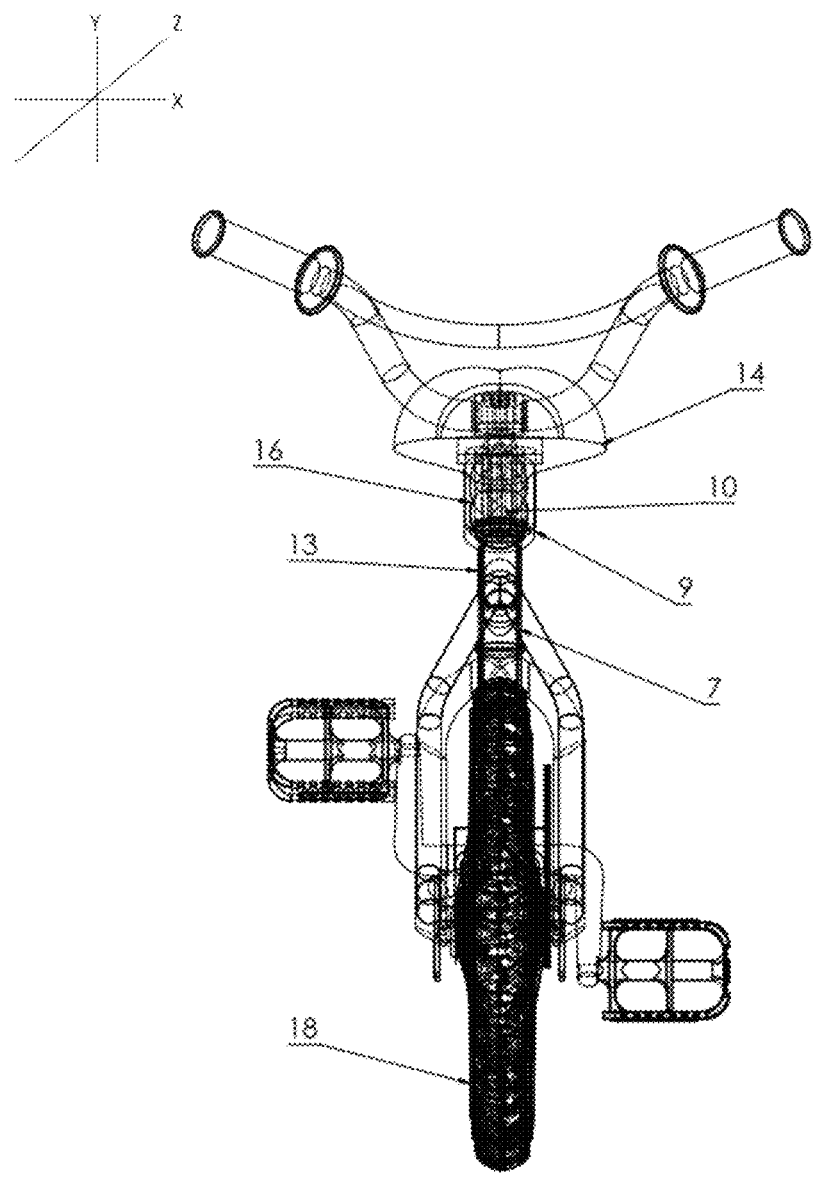
FIG. 4 is an elevation view of the back of the bicycle with the representative embodiment of the present invention. It shows the set of three (3) front-facing, stereoscopic video camera devices affixed to the seat post beneath the seat and above the back tire.

FIG. 4 illustrates an elevation of the back of the representative bicycle 7. A set of three (3) front-facing, stereoscopic video camera devices are affixed to the seat post 13 below the bicycle 7 seat 14, one front-facing, stereoscopic video camera device 9 facing in each cardinal direction except to the front of the bicycle 7. FIG. 4 shows a close up of one of the lenses 16 of one of the front-facing, stereoscopic video camera devices 9 facing away from the bicycle 7. Each front-facing, stereoscopic video camera device 9 shown captures a field of view 8 of continuous digital images the bicyclist would otherwise have to turn head away to see.

Together, the front-facing, stereoscopic video camera devices 9 shown in FIGS. 3 and 4 capture a 360 degree field of view 8 for the bicyclist to use in riding. Embodiments of this invention have front-facing, stereoscopic video camera devices 9 positioned in different mounting heights and orientations along the respective tubes. Multiple, front-facing stereoscopic video camera devices 9 may adjust, rotate, and tilt. Embodiments of this invention may capture digital images in standard or high definition resolution formats. This preferred embodiment relies on high-definition. Other embodiments of this invention may also rely or be augmented with other types of camera sensors and imaging technologies including Radar, Ultrasonic Sensors, and Light Detection and Ranging (LiDAR).

Figure 7:
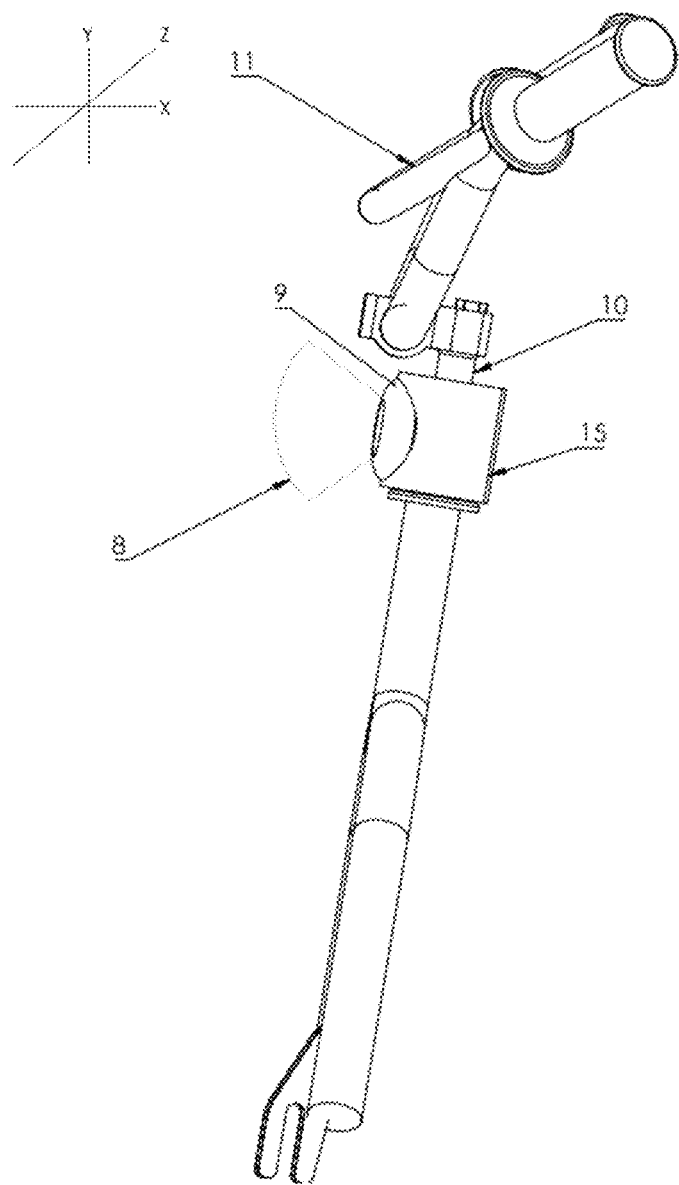
FIG. 7 is a close-up elevation view of the how one (1) front-facing stereoscopic video camera device is attached to the bicycle head tube in the embodiment of the present invention. It also shows a representative field of view.
Figure 8:
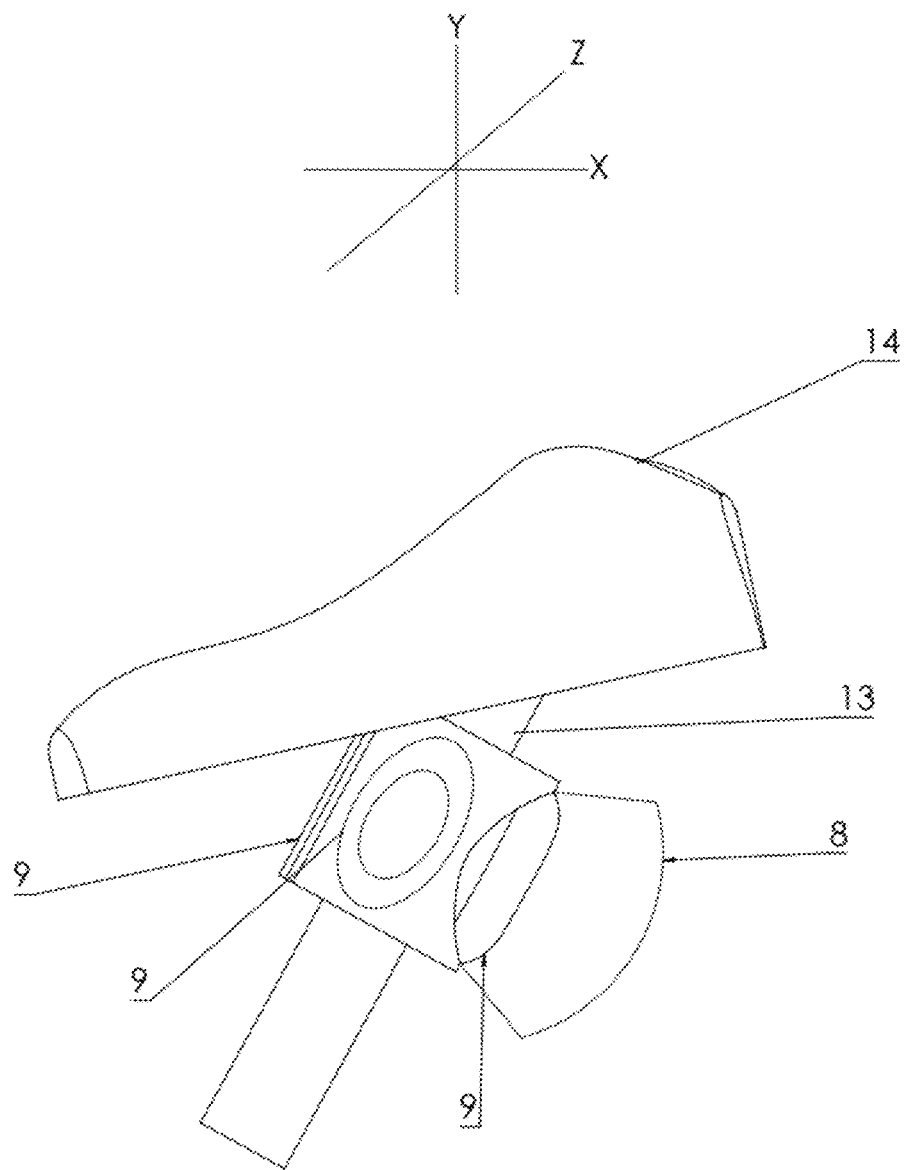
FIG. 8 is a close-up elevation view of how the set of three (3) front-facing, stereoscopic video camera devices are attached to the seat post in the embodiment of the present invention. Two (2) of the set of three (3) front-facing, stereoscopic video camera devices are shown. The third front-facing, stereoscopic video camera device is hidden from view behind the shown seat post facing into the page.

FIGS. 7 and 8 respectively illustrate front-facing stereoscopic video camera devices 9 affixed to the head tube 10 and seat post 13 respectively. FIG. 7 shows the projected field of view 8 of the front-facing stereoscopic video camera device 9 affixed to the head tube 10 by a front pen clamp 15.

FIG. 8 shows the projected field of view 8 of the rear front-facing stereoscopic video camera device 9 affixed to the seat post 13 by a front pen clamp 15 shared by the other front-facing stereoscopic video camera devices 9. Affixing and positioning the front-facing, stereoscopic video camera devices 9 in these locations in FIGS. 7 and 8 on the bicycle 7 reduce vibrations when traveling. When multiple front-facing, stereoscopic video camera devices 9 are appended on the seat post 13 as shown in FIG. 2, the bicyclist can view one or multiple fields of view (omnidirectional) 8 through the wearable display apparatus 3 without having to take eyes off the road.

Figure 9:
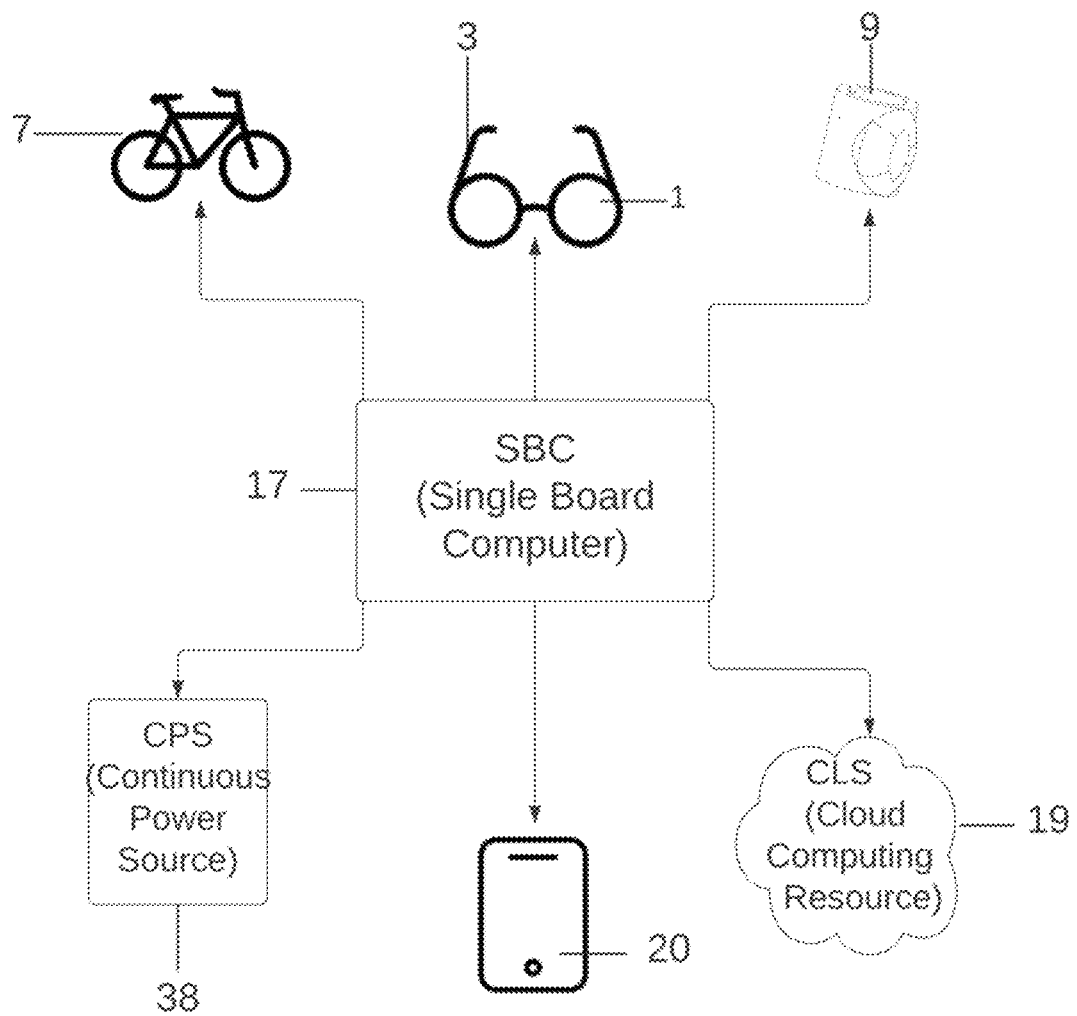
FIG. 9 is a block diagram showing how different components of the embodiment of the present invention are connected.

FIG. 9 illustrates a simplified block diagram that details how different components of the embodiment of the present invention are connected. Components may be connected using wires, wire-free, or a combination thereof using Bluetooth and/or Wireless Fidelity (Wi-Fi). In the preferred embodiment of this present invention, the following components are connected wire-free via a combination of Bluetooth and Wi-Fi to the bicycle 7 as shown: wearable display apparatus 3; front-facing, stereoscopic video camera devices 9, an embedded system 17; and a continuous power source 8. Digital images are captured from the front-facing, stereoscopic video camera devices 9 and sent to the embedded system 17, represented as a single board computer 17, for processing. Once processed, augmented images and words with safety-related 4 and guidance-related 5 information are superimposed on the viewport 1 of the bicyclist's field of view 38. The preferred embodiment of the invention uses a single board computer 17 as the embedded system 17, although alternative embodiments may use a combination of microprocessors, microcontrollers, and field programmable gate arrays. Processors, if not contained within the embedded systems 17, may also co-located within the wearable display apparatus 3, by which it projects digital images received from the front-facing, stereoscopic video camera devices 9. The embedded system 17, represented by the single board computer 17, shown in FIG. 9 is powered by a continuous power source 38. Both the continuous power source 38 and single board computer 17 are shown in FIG. 1, embedded in the down tube 37. FIG. 9 also shows a cloud computing resource(s) 19 and mobile device 20. An alternative embodiment may include a cloud computing resource(s) 19 to assist the embedded system 17 in processing the digital images and training the models the embedded system 17 runs. Similarly, a mobile device 20 like a smartphone may be used to report a crash and augment the display of the wearable display apparatus 3 for information and entertainment purposes.

Figure 10:
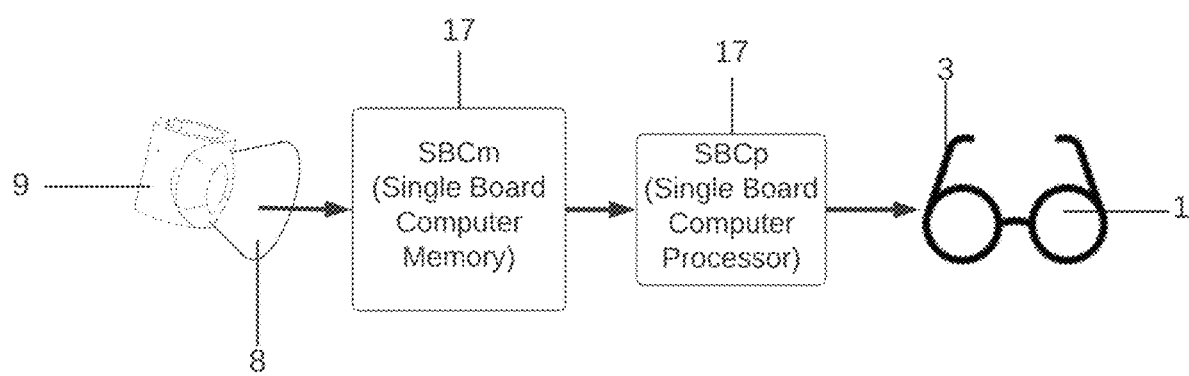
FIG. 10 is a representative end-to-end pipeline, the process flow diagram showing how digital images are ingested from the front-facing, stereoscopic video camera devices, processed in different parts of the single board computer, and translated into augmented reality through the wearable display apparatus.
Figure 11:
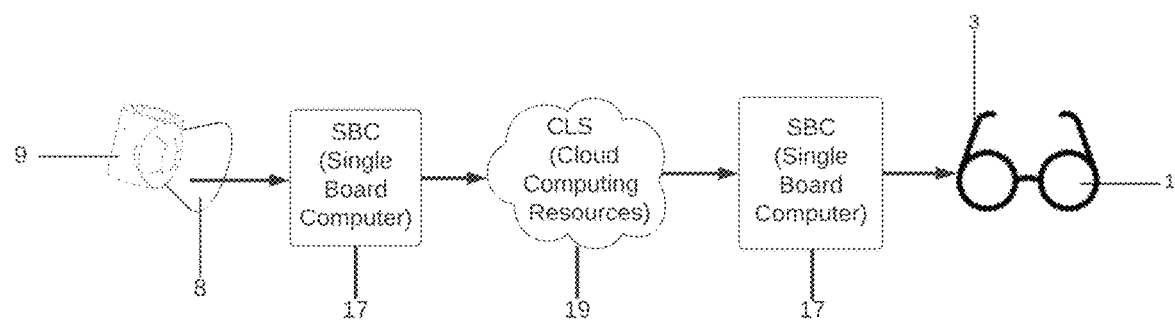
FIG. 11 is a representative end-to-end pipeline alternate, the process flow diagram showing how digital images are ingested from the front-facing, stereoscopic video camera devices, processed through a combination of the single board computer and the cloud computing resource, and translated into augmented reality through the wearable display apparatus.
Figure 12:
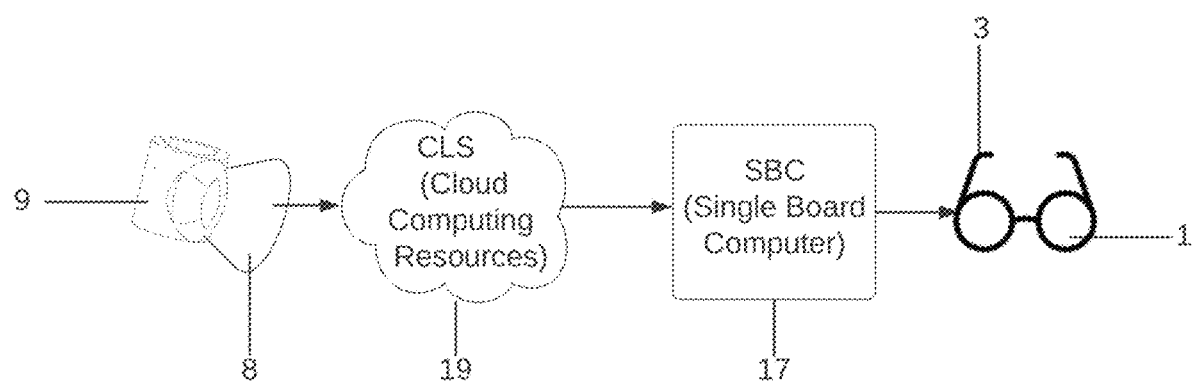
FIG. 12 is a representative alternative end-to-end pipeline, the process flow diagram showing how digital images are ingested from the front-facing cameras, processed through in the cloud computing resource, sent to the single board computer, and translated into augmented reality through the wearable display apparatus.

FIGS. 10-12 illustrate representative end-to-end workflow combinations of how digital images are ingested from the front-facing, stereoscopic video camera devices 9 to augmented reality in the viewport 1 of the wearable display apparatus 3. All embodiments begin with the front-facing, stereoscopic video camera devices 9 capturing digital images that are sent to either the cloud computing resource(s) 19 or the embedded system 17, represented in all instances as the single board computer 17. Consistent with FIG. 1, the wearable display apparatus 3 is represented as sunglasses 3. Digital images may also be saved to the memory of the cloud computing resource(s) 19 or single board computer 17 or stored on a combination of both.

FIG. 10 illustrates one embodiment relying solely on different parts of the single board computer 17 separately storing and processing the digital images. Typically, a single board computer 17 uses memory storage to store the digital images and the processor to analyze the digital images. The embodiment in FIG. 10 does not require continuous connection to the internet. FIG. 11 illustrates one embodiment relying on cloud computing resource(s) 19 intermittently between the single board computer 17 receiving the digital images from the front-facing, stereoscopic video camera devices 9 and the single board computer 17 projecting the augmented reality to the wearable display apparatus 3. The embodiment illustrated in FIG. 11 relies on a continuous internet connection. Finally, FIG. 12, illustrates an alternative embodiment where the digital images are sent to the cloud computing resource(s) 19 for processing before being sent back to the single board computer 17 for projecting onto the wearable display apparatus 3. FIG. 12 also relies on a continuous internet connection. Both the single board computer 17 and cloud computing resource(s) 19 can be used to record and store for download and playback of digital images and audio later.

The preferred embodiment of this invention includes a single board computer 17 that connects to and controls one or more front-facing, stereoscopic video camera devices 9. The single board computer 17 can:

i. direct front-facing, stereoscopic video camera devices 9 to capture digital images and video, and
 ii. adjust all parameters of the front-facing, stereoscopic video camera devices 9 to change their individual fields of view 8, and
 iii. direct front-facing, stereoscopic video camera devices 9 to save digital images and video to the single board computer's 17 memory card and cloud computing resource(s) 19, and
 iv. parse video into individual digital images and reconstructs video from digital images in sequence, and
 v. direct front-facing, stereoscopic video camera devices 9 to send digital image
 vi. and video to the single board computer's 17 processor or cloud computing resource(s) 19, and
 vii. detect objects, people, road debris and other regions of interest in digital images and video, and
 viii. predict digital image depth in digital images and video, and
 ix. segment digital images into classes of unobstructed and obstructed space in digital images and video, and
 x. identify the most probable free path in digital images and video, and
 xi. project most probable path in digital images and video as detailed in viii.
 xii. label v. through xi. In digital images and video, and
 xiii. extract x. in digital images and video, and
 xiv. track the change in field of view 8 and height in digital images and video, and
 xv. track the time elapsed between i. through the project completion of xiv.
 xvi. fit vi. and xi to the operator's field of view 8 based upon all previous steps. As previously mentioned, cloud computing resource(s) 19 may assist and augment the functionality described above accomplished by the embedded system represented by the single board computer 17.

Figure 13:
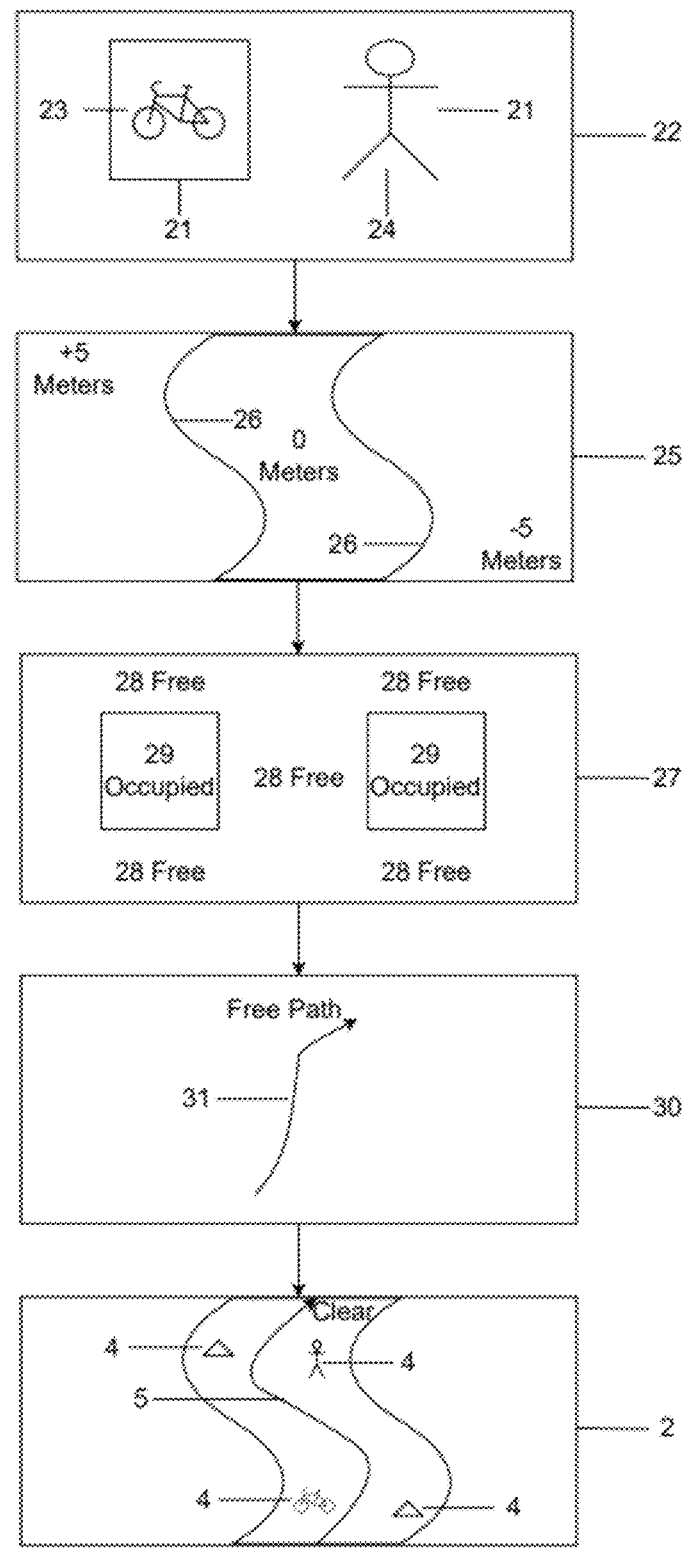
FIG. 13 shows how the reimagined system and process analyze digital images using the software models described.

FIG. 13 illustrates this reimagined system and process through a flow diagram of separate scenes. This diagram describes how digital images are processed using a single board computer 17, cloud computing resource(s) 19, or a combination thereof to produce the augmented reality the bicyclist ultimately sees in the viewport 1 of the wearable display apparatus 3. In the first representative scene 22, a bicycle 23 and person 24 are both detected ahead of the bicyclist through the front-facing, stereoscopic video camera device 9. Both the bicycle 23 and person 24 are shown with separate bounding boxes 21. In the second scene 25, changes in terrain elevation 26 are detected and annotated on the outer peripheries in the field of the view 8 of the bicyclist. In the third scene 27, the scene is divided into free 28 and occupied space 29. The fourth scene 30 shows the output of the most probable free path 31 for the bicyclist to avoid the space occupied 29 by the bicycle 23 and person 24 while also avoiding the changes in terrain elevation 26. The fifth scene is the viewport 2 showing the bicycle 23 and person 24 detected ahead, the safety-related information 4 around the changes in terrain elevation 26, and the clear path to navigate the bicycle 7.

Figure 14:
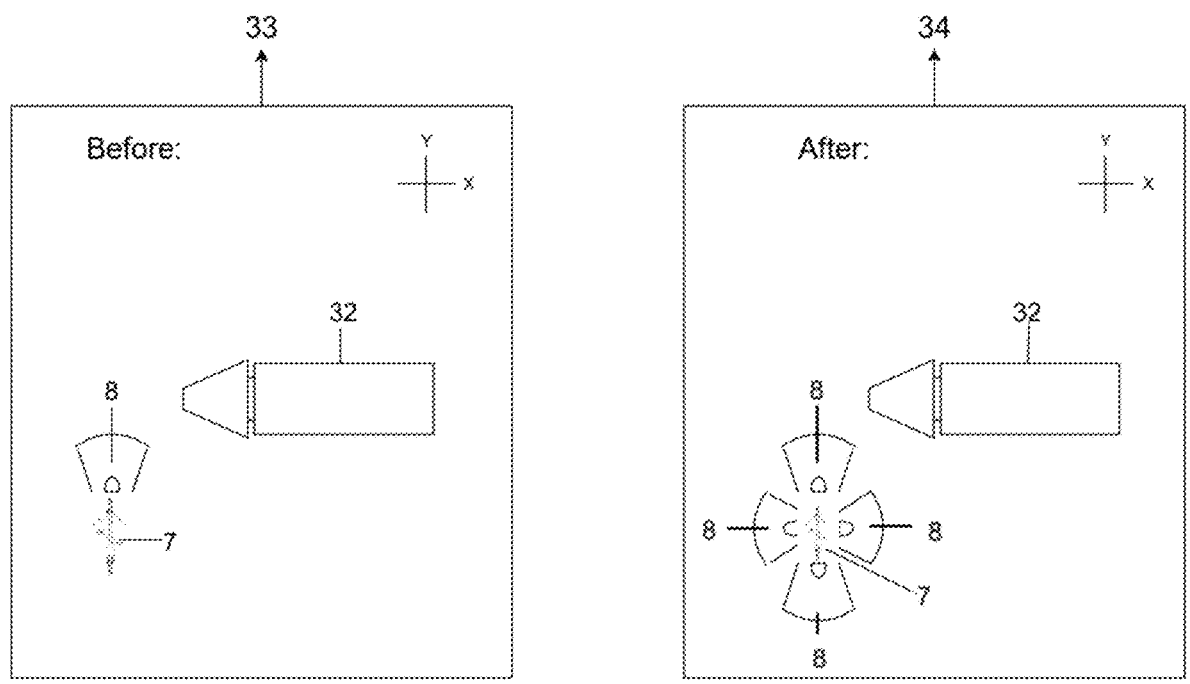
FIG. 14 contrasts the before and after frames of the reimagined system process and system, which enables the cyclist to enhance the current field of vision forward in addition to those on both sides and the rear of the bicycle.

FIG. 14 contrasts the before frame 33 without the reimagined process and system to the after frame 34 with the reimagined process and system. Before 33, the bicyclist does not see the truck 32 approaching from the right in the field of view 8 without turning the head. The bicyclist has a more limited 180 degree field of view 8 limited to the front of the bicycle 7. With the present invention, the bicyclist gets an enlarged and enhance field of view 8 using the front-facing, stereoscopic video camera devices 9. Using the present invention, the bicyclist sees the truck 32 approaching at right and the entire 360-degree peripheries of the bicycle 7 without having to turn the head. Sound and other mechanical elements help provide the bicyclist with safety-related 4 and guidance-related 5 information to maneuver the bicycle 7.

Figure 15:
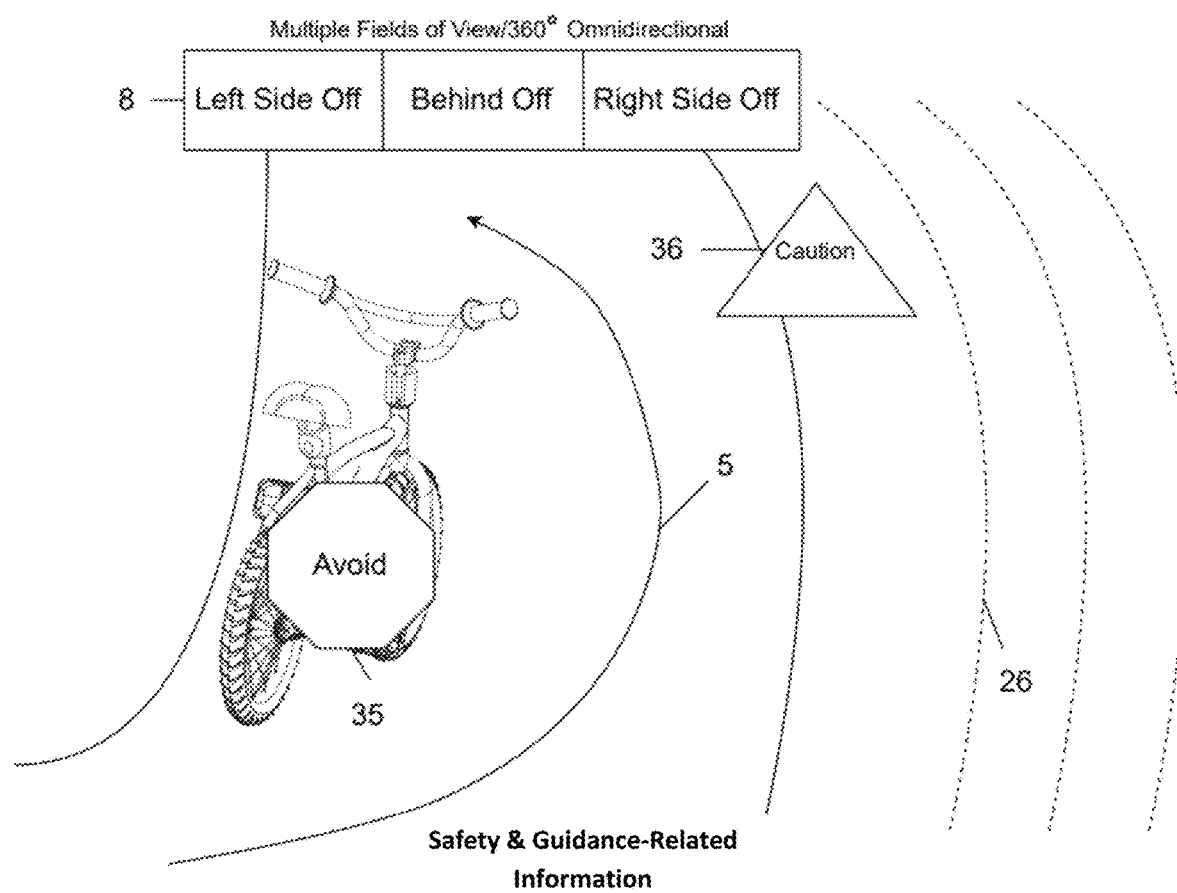
FIG. 15 shows a representative view 2 a cyclist might see using the reimaged process and system as detailed in FIG. 1.

FIG. 15 illustrates what a bicyclist would see in the viewport 1 of the wearable display apparatus 3. A red octagon and the word "avoid" 35 tell the bicyclist to steer clear of the parked bicycle at right. An orange triangle and word "caution" 36 tells the bicyclist to be careful around the change in terrain elevation 26 at left. An arrow in the middle shows a clear trajectory 5 to avoid both the bicycle and change in terrain elevation 26.

Augmented reality projections can be adjusted in terms of level of detail provided, size of images and words, and color. Safety-related 4 and guidance-related 5 information can automatically flash and adjust in brightness as the operator approaches the alert. If there are no obstacles in the real-world environment 6, no safety-related 4 information will be projected and superimposed on the viewport 1 of the wearable display apparatus 3.

As illustrated in FIG. 1, one physical button housed within the wearable display apparatus 3 turns the invention on. Another physical button, housed within the previously mentioned button, toggles the detail level of safety-information 4 projected. When powered on, the wearable display apparatus 3 indicates its power status:

externally via an outward-facing lighting array via the wearable display apparatus 3 internally via a visual indicator noted for the operator via the wearable display apparatus 3

Volume for the audible indicators can also be adjusted on the wearable display apparatus 3.

Embodiments include object detection model(s) to detect other stationary and moving objects in the operator's field of view 8.

Embodiments include depth estimation model(s) to detect changes in topography and elevation within the operator's field of view 8.

Embodiments include free space segmentation model(s) to detect and identity paths free of potential collision with real-world elements within the operator's field of view 8.

Embodiments include pre-processing algorithms to suppress and remove distortions from the digital images captured and enhance features relevant to the work of artificial-intelligence-based and non-artificial intelligence-based models.

Embodiments include post-processing algorithms to enhance the digital images captured for playback.

Embodiments include natural language processing model(s) to augment system capabilities.

The description is intended to be illustrative and not limiting. Various changes may be made without department from the spirit and scope of the invention. Alternatives, modifications, and variations will be apparent to those skilled in the art.

The described embodiments of the invention are intended to be merely exemplary and numerous variations and modifications will be apparent to those skilled in the art. All such variations and modifications are intended to be within the Scope of the present invention as defined in the appended claims. There are changes that may be made without departing from the spirit and scope of the invention.

APPENDIX

For clarity, definitions for terms used in the patent are provided below.

Augmented Reality—technique or display method that superimposes a virtual image created by computer programming on the real-world environment that is visible to the user's eyes.

Cloud Computing Resource—on-demand availability of computer system resources, especially data storage (cloud storage) and computing power, without direct active management by the user.

Depth Estimation—a computer vision task designed to estimate depth from a 2D image. The task requires an input RGB image and outputs a depth image. The depth image includes information about the distance of the objects in the image from the viewpoint, which is usually the camera taking the digital image."

Driver Assistance Systems—active and passive technologies that assist the driver in operating the vehicle. Examples include traction control systems, navigation systems, blind spot monitors, back-up cameras, heads-up displays, automated parking, adaptive cruise control, radar sensors, LiDAR (Light Detection and Ranging) sensors, vehicle-to-x communication, and active steering assist.

Embedded System—a microprocessor or microcontroller-based system of hardware and software designed to perform dedicated functions within a larger mechanical or electrical system.

Free Space Segmentation—Pixel-level understanding of the scene in front of the vehicle, to separate "free-space" [24]—road surfaces that are free of obstacles from other scene content in view. This is a critical perceptual problem in autonomous vehicle navigation that decides whether the path ahead is safe and free of potential collisions. While some problems (like traffic sign detection) may just require detecting and recognizing objects, avoiding collisions requires this fine-grained, pixel level understanding.

Guidance-Related Information—Output related to guiding vehicles around hazards on, in, and near travel way facilities in which vehicle may operate including people, objects, debris, and changes in depth.

Object Detection—a common computer vision problem which deals with identifying and locating objects of certain classes in the image.

Omnidirectional—capable of perceiving and transmitting from multiple directions.

Pedalcyclist—bicyclists and other cyclists including riders of two-wheel, nonmotorized vehicles, tricycles, and unicycles powered solely by pedals.

Pre-Processing—Scripts run before an item or entry is saved before the value and validation rules checking is complete.

Post-Processing—Scripts run before an item or entry is saved after the value and validation rules checking is complete.

Safety-Related Information—Data related to potential hazards on, in, and near travel way facilities in which vehicles may operate including, but not limited to potential hazards on, in, and near travel way facilities in which vehicles may operate including, but not limited to people, objects, debris, and changes in depth.

Single Board Computer—a complete computer in which a single circuit board comprises memory, input/output, a microprocessor and all other necessary features.

Segmentation—Localization marking every pixel in the image which contains the subject.

Wireless Adapter—a hardware device that is generally attached to a computer or other workstation device to allow it to connect to a wireless system.

Wireless Camera—also known as a Wireless Fidelity (Wi-Fi) camera, this type of camera transmits its footage over Wi-Fi and is powered by AC power. A wireless camera is not always wire-free; rather, it's called a wireless camera because it uses wireless internet (Wi-Fi).

What is claimed is:

1. A wearable and/or attachable display apparatus (physical or augmented reality lens, glasses, or display) for viewing the vehicle user's real-world surrounding environment, the display apparatus comprising:
    a stereoscopic video camera device that captures the surrounding environment including at least an area in front of the stereoscopic video camera device;
    a projection system that receives standard and high-definition video input from the video camera device and projects safety-related and guidance-related information onto the viewport of the operator's display wherein safety-related information is data related to potential hazards on, in and near travel way facilities in which vehicles may operate including, but not limited to potential hazards on, in and near travel way facilities in which vehicles may operate including, but not limited to people, objects, debris and changes in depth and guidance-related information is an output related to guiding vehicles around hazards on, in, and near travel way facilities in which vehicle may operate including people, objects, debris, and changes in depth;
    one or more computer vision models that analyzes the surrounding environment as an input from video camera device(s) and outputs safety-related and guidance-related information (combinations of digital images, labels, symbols, and/or words to indicate the presence of an opportunities to maneuver around potential hazards) onto the operator's display that superimposes with the user's field of vision;
    a housing for the stereoscopic video camera device that is mountable and detachable;
    a front-facing stereoscopic video camera device, projection system, and housing that can be mounted on the vehicle's handlebars, helmet, or integrated into glasses or goggles;
    a wearable display apparatus that is configured for the operator to simultaneously see the surrounding environment through the display and the safety-related and guidance-related information outputs projected by the projector system;
    a wearable display apparatus that includes a microphone device that allows for the recoding and transmission of audio;
    a wearable display apparatus that allows for the toggling on and off of audio and visual data outputs from the projection system and microphone;
    a projection system that transmits multi-colored optical elements that detail safety-related and guidance-related information to the wearable display apparatus;
    a wearable display apparatus and projection system that can be configured by a mobile, remote-controlled device;
    a wearable display apparatus, projection system, and front-facing, stereoscopic video camera device components that are modular, allowing them to be replaced over time; and
    a wearable display, projection system, and front-facing, stereoscopic video camera device that can be connected using wires or wirelessly.

2. A system, comprised of wearable and/or attachable display apparatus (physical or virtual lens, glasses, or display) according to claim 1 for viewing and assessing trajectory guidance safety, based on the user's real-world surrounding environment.

3. A process, comprised of the human pilot, the system and/or attachable display apparatus (physical or virtual lens, glasses, or display) according to claim 1 for viewing and assessing the trajectory guidance safety, based on the user's real-world surrounding environment.

4. The wearable and/or attachable apparatus of claim 1, wherein said vehicle is a bicycle.

5. The wearable and/or attachable apparatus of claim 1, wherein said vehicle is a motorcycle.

6. The wearable and/or attachable apparatus of claim 1, wherein said vehicle is a scooter.

7. The wearable and/or attachable apparatus of claim 1, wherein said vehicle is a car.

8. The wearable and/or attachable apparatus of claim 1, wherein said vehicle is a truck.

9. The wearable and/or attachable apparatus of claim 1, wherein said vehicle is a water-borne vessel.

10. The wearable and/or attachable apparatus of claim 1, wherein said vehicle is an aircraft.

11. The wearable and/or attachable apparatus of claim 1, wherein said vehicle is an all-terrain vehicle.

* * * * *